United States Patent [19]
Anderson et al.

[11] 3,736,518
[45] May 29, 1973

[54] MASER INCORPORATING CRYSTAL HAVING F-CENTERS

[75] Inventors: Charles Hammond Anderson, Oxford, England; Bernard Robert Feingold, Waltham, Mass.; Edward Stephen Sabisky, Trenton, N.J.

[73] Assignee: RCA Corporation, New York, N.Y.

[22] Filed: Nov. 22, 1971

[21] Appl. No.: 200,715

[52] U.S. Cl. ............................ 330/4, 330/56, 331/94
[51] Int. Cl. ................................................ H01s 1/02
[58] Field of Search ...................... 330/4, 56; 331/94

[56] References Cited

UNITED STATES PATENTS

| | | | |
|---|---|---|---|
| 3,454,885 | 7/1969 | Anderson | 331/94 |
| 3,403,349 | 9/1968 | Wieder | 331/94 |
| 3,678,400 | 7/1972 | Holton | 330/4 |
| 3,350,632 | 10/1967 | Robinson | 330/4 |

OTHER PUBLICATIONS

Sabisky et al., "Solid State Optically Pumped Microwave Masers", Pg. 287-295, I.E.E.E., J.Q.E., QE-3, No. 7

Clark, "Optical Pumping by Millimeter-Wave Masers", Elec. & Elec. Abst., 8/70, Vol. 73, No. 872-Thesis

*Primary Examiner*—Benjamin A. Borchelt
*Assistant Examiner*—N. Moskowitz
*Attorney*—Edward J. Norton

[57] ABSTRACT

A maser incorporating a crystal having F-centers. The crystal, which may be an alkali halide such as KI, exhibits dichroism and may be pumped by selective absorption with circularly polarized light energy. The light energy is preferably derived from a diode laser, such as gallium aluminum arsenide, and has a wavelength coinciding with a point on the band edge of the optical absorption band of the crystal. Both a resonant cavity and a traveling wave configuration are disclosed.

19 Claims, 3 Drawing Figures

Patented May 29, 1973 3,736,518
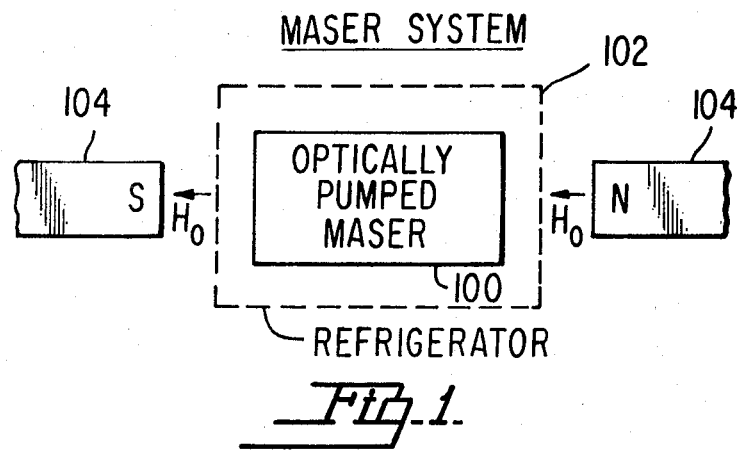
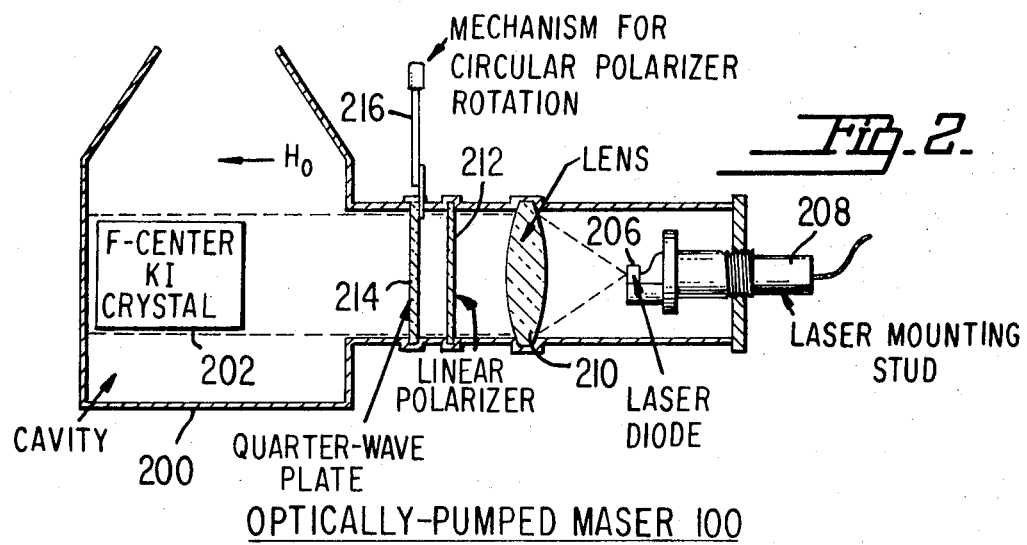
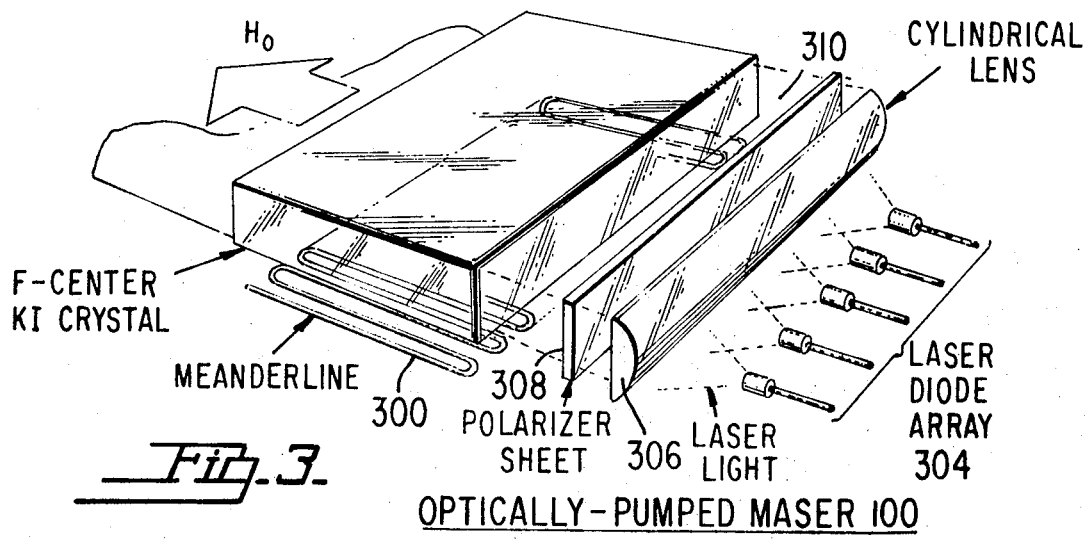

MASER INCORPORATING CRYSTAL HAVING F-CENTERS

The invention herein described was made in the course of or under a contract or subcontract thereunder with the Department of the Navy.

This invention relates to optically-pumped masers, and, more particularly, to such masers employing a crystal having F-centers as the active massing medium.

Reference is made to U.S. Pat. No. 3,454,885, issued July 8, 1969 to Charles H. Anderson, in which it is disclosed that a paramagnetic maser crystal, such as divalent thulium doped calcium fluoride, exhibiting circular dichroism may be optically pumped with light energy which is circularly polarized in a given direction, due to selective absorption of the light energy by the respective upper and lower Zeeman sub-levels of the ground level. Therefore, excitation of a maser crystal exhibiting dichroism by incident circularly-polarized light energy results in the upper and lower Zeeman sub-levels of the ground level being differentially depleted. By properly choosing the direction of the circularly polarized light, the lower Zeeman sub-level may be made to selectively absorb more incident photons and hence be depleted to a greater extent than the upper level. This inverts the population between the two sub-levels, thereby providing maser pumping. The more dichroism exhibited by the maser crystal, the more effective will be this type of pumping.

The bandwidth of a maser depends upon the electron paramagnetic resonance line width of the maser crystal. The value of the electron paramagnetic resonance line width, and hence the bandwidth of the maser, is an inherent characteristic of the material of which the maser crystal is composed. All of the maser crystals currently in use, such as rutile, ruby and divalent thulium doped calcium fluoride (discussed above in connection with dichroism) have an electron paramagnetic resonance line width in the order of approximately 50 MHz.

As is known, a master is operated at cryogenic temperatures. The reason for this is that unless the relaxation rate between the upper and lower Zeeman sub-levels is sufficiently low, an effectively inverted population cannot be maintained. The relaxation rate is dependent on the crystal, paramagnetic impurity (F-centers in this case) and decreases with decreasing temperature. In particular, current maser crystals, such as ruby and rutile must be maintained at a temperature below 5°K, such as typically 4.2°K, in order to achieve a low relaxation rate. Divalent thulium doped calcium fluoride operates as an X-band maser up to a temperature of about 6.2°K.

The cost of a cryogenic refrigerator increases very rapidly as the operating temperature is lowered. For instance, a refrigerator providing about 1 watt of cooling capacity at a temperature of 4.2°K costs in the order of $70,000. However, a similar refrigerator having an operating temperature of 10°K costs only about $23,000. If the operating temperature of the refrigerator is raised to 15°K, the cost goes down to about $16,000.

In accordance with the present invention, it has been found that crystals, such as alkali halide crystals, having a sufficient density of F-centers are suitable for use in optically-pumped masers. Among such alkali halide crystals, a crystal of potassium iodide (KI) is the most suitable for use in an optically-pumped maser. In particular, KI exhibits: (1) a high degree of circular dichroism; (2) operates with low noise at temperatures higher than 8°K (and in some circumstances at temperatures greater than 11°K) or even higher; (3) has an intrinsic bandwidth of 500 MHz (in the order of ten times higher than the prior art maser crystals, discussed above), and (4) is capable of operating in the millimeter band at frequencies as high as 40 GHz.

These and other features and advantages of the present invention will become more apparent from the following detailed description taken together with the accompanying drawing, in which:

FIG. 1 is a block diagram of a typical maser system;

FIG. 2 is a first embodiment of an optically-pumped maser illustrating the present invention in a resonant-cavity configuration;

FIG. 3 is a second embodiment of an optically-pumped maser incorporating the present invention in a traveling-wave maser configuration.

Referring now to FIG. 1, there is shown a typical maser system. Specifically, the maser system includes an optically-pumped maser 100, which is situated within refrigerator 102. Refrigerator 102 maintains the maser crystal of optically-pumped maser 100 at an appropriate cryogenic temperature. In addition, optically-pumped maser 100 is situated within a constant magnetic field $H_o$ of a predetermined magnitude and direction provided by magnet means 104. The direction of the light (not shown in FIG. 1) employed in optically-pumping the maser crystal of maser 100 is oriented substantially parallel to the direction of magnetic field $H_o$.

FIG. 2 shows one particular configuration of optically-pumped maser 100, which constitutes a first preferred embodiment of the present invention. Referring now to FIG. 2, the configuration of optically-pumped maser 100 illustrated therein comprises cavity 200 which is resonant at the maser operating frequency. The microwave signal to be amplified (not shown) is applied to and extracted from cavity 200. Situated within cavity 200, as shown, is a block of F-center potassium iodide (KI) crystal 202. As indicated by the arrow, optically-pumped maser 100 is within a constant horizontally-oriented magnetic field $H_o$ pervades crystal 202.

Crystal 202 is optically pumped with a circularly polarized collimated beam of light traveling horizontally in a direction parallel to magnetic field $H_o$. Beam 204 is derived from laser diode 206, which is supported in the manner shown by laser mounting stud 208. (Although for the sake of clarity in FIG. 2, only a single laser diode is shown, in practice, to obtain a sufficient intensity of light, either a stack of laser diodes or a plurality of series-connected laser diodes may be substituted for laser diode 206.)

The light emitted from laser diode 206 is converted into circularly-polarized collimated beam 204 by means of collimating lens 210, linear polarizer 212 and quarter-wave plate 214. Quarter-wave plate 214 may be rotated by mechanism 216 in order to achieve circular polarized light. The light emerges from linear polarizer 212 passes through quarter-wave plate 214, which can be rotated, and emerges converted to circular polarization in a particular one of two directions (clockwise or counter-clockwise) determined by the selected setting of quarter-wave plate 214 by mechanism 216. In practice, the direction of circular polarization of beam 204 is chosen to effect optical pumping of crystal 202 by selective absorption, as discussed above in connection with reference U.S. Pat. No. 3,454,885.

Before discussing the operation of the optically-pumped maser shown in FIG. 2, F-centers in alkali halide crystals, in general, and in KI crystal, in particular, will be considered.

An F-center is an electron trapped in a negative ion vacancy in a crystal, such as an alkali halide crystal. The spin of the trapped electron is unpaired; the F-center is therefore paramagnetic. Thus, the F-center is a possible maser material. Furthermore, F-centers have circular dichroism and are therefor capable of selective absorption pumping. The following table is a list of the circular dichroism exhibited by various alkali halide crystals:

| Crystal | $\Delta$(Circular Dichroism) (meV) |
|---|---|
| NaCl | $-7.7 \pm 1.0$ |
| NaBr | $-28.3 \pm 6$ |
| KCl | $-10.1 \pm 1.0$ |
| KBr | $-29.8 \pm 4$ |
| KI | $-57.0 \pm 8$ |
| RbBr | $-26.6$ |
| RbCl | $-15.1$ |
| CsBr | $-40.9 \pm 5$ |
| CsCl | $-37.2 \pm 5$ |

It will be seen from the table that the maximum dichroism is exhibited by KI. This is one reason why KI is the preferred alkali halide crystal for use as a maser crystal.

The relaxation rate at a given temperature for F-centers in alkali halides, such as KI, is significantly lower than ruby, rutile or even divalent thulium doped calcium fluoride. This means that the operating temperature of the maser can be maintained at a higher temperature, such as above 11°K in many cases and above 8°K in all cases. This significantly lowers the cost of the required refrigerator.

In order to obtain the required high F-center densities in KI, the F-centers must be introduced by additive coloration. This is accomplished by inserting a clear KI crystal in a copper bomb with some solid potassium metal. The bomb is heated, vaporizing the potassium. Some of the potassium is deposited on the crystal, and since the crystal is hot, iodide ions migrate to the surface and combine with the new potassium. Essentially, a new layer of crystal is formed. The crystal is then cooled rapidly, trapping these iodides at the surface. The resultant negative ion vacancies left in the bulk of the material are filled with electrons, forming F-centers. The density of F-centers produced is dependent on the temperature, the heating time, the cooling time and the crystal dimensions. By heating the bomb to 600°C for 2 hours and then cooling by evaporating water from its surfaces, the required high F-center concentration, such as $5 \times 10^{17}$ centers/cm$^3$, is obtained.

Considering now the operation of FIG. 2, light beam 204, which illuminates crystal 202, is circularly polarized in a direction determined by the setting of mechanism 216. Mechanism 216 is set in that position which results in the pumping of crystal 202 by selective absorption, as described above. Since light beam 204 is derived from laser diode 206, the wave energy therein will be coherent and occur at a wavelength determined by the emission characteristics of laser diode 206. It is desirable that the absorption characteristics of the F-centers in KI crystal 202 at the wavelength of beam 204 be sufficiently high so that crystal 202 is not appreciably transparent to the wave energy of beam 204 incident thereon, but yet be sufficiently low so that not most of the incident wave energy is absorbed in the immediate vicinity of the incident right edge of crystal. In other words, the absorption characteristics of crystal 202 at the wavelength of the incident wave energy preferably should be such that as beam 204 passes through the thickness of crystal 202, appreciable absorption of the wave energy takes place throughout the thickness thereof. This wide distribution of absorbed wave energy is necessary in order to efficiently pump all the material throughout crystal 202.

The F-center optical absorption bandwidth of an alkali halide, such as KI, is relatively wide compared to the emission bandwidth of a laser diode. It is therefore possible to achieve an appropriate value of absorption (neither too high nor too low) of the wave energy of beam 204 by crystal 202. This is accomplished by band-edge pumping, wherein the center wavelength of the laser diode output is chosen to coincide with a selected point toward the edge of the F-center optical absorption band of the crystal. For instance, if laser diode 206 is a gallium aluminum arsenide laser emitting coherent light having a center wavelength of about 6900 Angstroms, coinciding with a point on the upper band edge of the F-center optical absorption linewidth of crystal 202, the relative absorption of crystal 202 will be only about one percent of its maximum absorption at about 6600 Angstroms, the center of the F-center optical band.

Referring now to FIG. 3, there is shown a traveling wave maser configuration of the present invention. In particular, meander line 300, through which a microwave signal to be amplified is transmitted, is cooperatively coupled to F-center KI crystal 302. Laser diode array 304, cylindrical lens 306 and polarizer sheet 308 cooperate to produce a collimated beam 310 of circularly polarized light, which is incident on crystal 302. As shown in the drawing, the direction of beam 310 is parallel to the direction of magnetic field $H_o$ and perpendicular to the mean direction of travel of a microwave signal through meander line 300. As in the case of FIG. 2, discussed above, the direction of the circular polarization of beam 310 is that required to effect pumping of the F-center KI maser crystal.

In general, the operation and advantages of the traveling wave maser of FIG. 3 are identical to the operation and advantages of the resonant cavity configuration of FIG. 2, described in detail above. However, as is known, the tuning of a traveling wave maser is controlled by the dimensions of the iterative elements of meander line 300. The dimensions of all the elements may be the same, in which case the tuning of the maser remains constant over the entire length of crystal 302. On the other hand, by varying the dimensions of the iterative elements of meander line 300 along the length of crystal 302, staggered tuning of the maser may be achieved. Although the intrinsic bandwidth of crystal 302 remains in the order of 500 MHz, with staggered tuning it is possible to operate the maser over an effective bandwidth of as much as 1500 MHz at a center frequency in the C band.

Any other type of known slow-wave structure may be substituted for the meander line shown in FIG. 3.

What is claimed is:

1. In an optically-pumped maser comprising a paramagnetic maser crystal adapted to be located in a given magnetic field and means for illuminating said maser crystal with light energy directed parallel to said given magnetic field to effect optical pumping of said maser crystal; the improvement wherein said maser crystal comprises a crystal having F-centers.

2. The maser defined in claim 1, wherein said crystal is composed of potassium iodide.

3. The maser defined in claim 2, wherein the density of said F-centers is in the order of $5 \times 10^{17}$ centers/cm$^3$.

4. The maser defined in claim 2, wherein said illuminating means includes means for illuminating said potassium iodide crystal with light energy which is circularly polarized in that direction which results in pumping said crystal by selective absorption.

5. The maser defined in claim 2, wherein said illuminating means comprises a laser diode.

6. The maser defined in claim 5, wherein said laser diode is a gallium aluminum arsenide laser diode.

7. The maser defined in claim 2, wherein said illuminating means illuminates said crystal with substantially monochromatic wave energy having a given wavelength coinciding with a point on the edge of the optical absorption band of said potassium iodide crystal.

8. The maser defined in claim 7, wherein said given wavelength is substantially 6900 Angstroms.

9. The maser defined in claim 8, wherein said illuminating means includes a gallium aluminum arsenide laser diode for generating said wave energy.

10. The maser defined in claim 1, wherein said illuminating means includes means for illuminating said alkali halide crystal with light energy which is circularly polarized in that direction which results in pumping said crystal by selective absorption.

11. The maser defined in claim 1, wherein said illuminating means comprises a laser diode.

12. The maser defined in claim 1, wherein said laser diode is a gallium aluminum arsenide laser diode.

13. The maser defined in claim 1, wherein said illuminating means illuminates said crystal with substantially monochromatic wave energy having a given wavelength coinciding with a point on the edge of the optical absorption band of said alkali halide crystal.

14. The maser defined in claim 1, further including a resonant cavity capable of supporting a microwave signal to be amplified by the maser, said maser crystal being located within said cavity.

15. The maser defined in claim 1, further including a slow-wave structure located in cooperative relationship with said maser crystal for supporting a traveling microwave to be amplified by said maser.

16. The maser defined in claim 15, wherein said slow-wave structure comprises a meander line.

17. The maser defined in claim 1, wherein said crystal is an alkali halide.

18. In an optically-pumped maser comprising a paramagnetic maser crystal adapted to be located in a given magnetic field and means for illuminating said maser crystal with light energy directed parallel to said given magnetic field to effect optical pumping of said maser crystal; the improvement wherein said maser crystal comprises an alkali halide crystal consisting of one of NaCl, NaBr, KCl, KBr, KI, RbBr, RbCl, CsBr and CsCl, said crystal incorporating a given density of F-centers which is sufficiently high for said one alkali halide crystal to operate as a paramagnetic maser crystal.

19. The maser defined in claim 18, wherein said given density is in the order of $5 \times 10^{17}$ centers/cm$^3$.

* * * * *